United States Patent [19] [11] 4,104,348

Munk et al. [45] Aug. 1, 1978

[54] METHOD AND APPARATUS FOR FILLING MOLDS

[75] Inventors: Edmund Munk; Herbert Haas; Gerd Weinberg, all of Oberstenfeld, Fed. Rep. of Germany

[73] Assignee: Werzalit-Pressholzwerk J.F. Werz Jr. KG, Oberstenfeld, Fed. Rep. of Germany

[21] Appl. No.: 688,919

[22] Filed: May 21, 1976

Related U.S. Application Data

[60] Continuation of Ser. No. 337,217, Mar. 1, 1973, which is a division of Ser. No. 78,959, Oct. 7, 1970, which is a continuation of Ser. No. 655,024, Jul. 21, 1967.

[30] Foreign Application Priority Data

Jul. 29, 1966 [DE] Fed. Rep. of Germany ........... 49820

[51] Int. Cl.[2] ........................................ B29C 5/06

[52] U.S. Cl. ........................................ 264/121

[58] Field of Search .................. 264/121; 425/80, 256, 425/420, 812

[56] References Cited

U.S. PATENT DOCUMENTS

| | | | |
|---|---|---|---|
| 2,592,521 | 4/1952 | Thompson | 264/121 |
| 3,099,045 | 7/1963 | Honkanen | 264/349 |
| 3,140,327 | 7/1964 | Dettmer | 264/119 |
| 3,164,649 | 1/1965 | Poole et al. | 264/121 |
| 3,192,561 | 7/1965 | Archer et al. | 264/120 |
| 3,283,049 | 11/1966 | O'Donnell et al. | 264/121 |
| 3,341,890 | 9/1967 | Oja | 264/121 |
| 3,431,331 | 3/1969 | Pincus et al. | 425/812 |

*Primary Examiner*—Robert F. White
*Assistant Examiner*—James R. Hall
*Attorney, Agent, or Firm*—Michael J. Striker

[57] ABSTRACT

The nonflowing molding materials are blown into the mold cavity which has a screen defining one surface of the article to be molded. The materials first fill up the remote areas of the cavity as the carrying air vents through the screen. As the cavity fills up to the feeding nozzle, a vent flap in the nozzle body opens up, allowing the carrying air to vent through the screened opening exposed by the flap until the mold is completely filled and the air is cut off.

5 Claims, 8 Drawing Figures

Fig.- 2
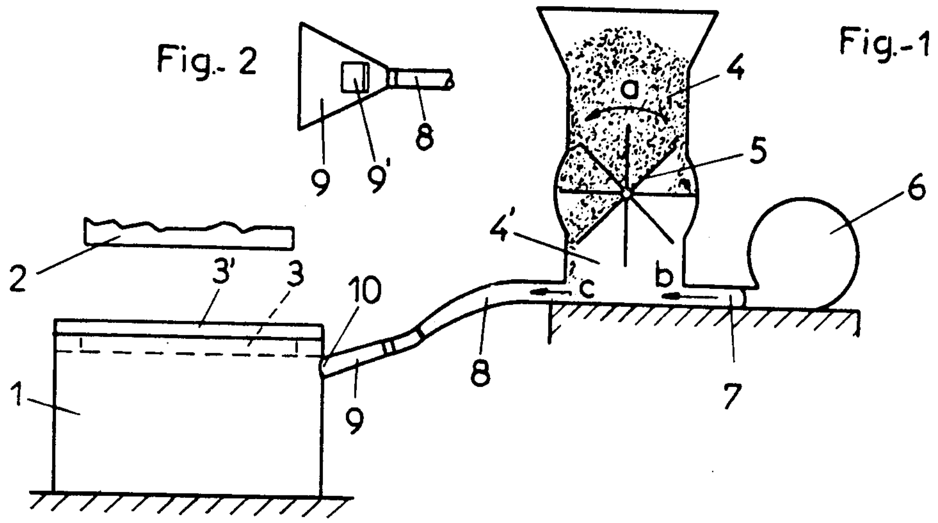
Fig.-1
Fig.- 3
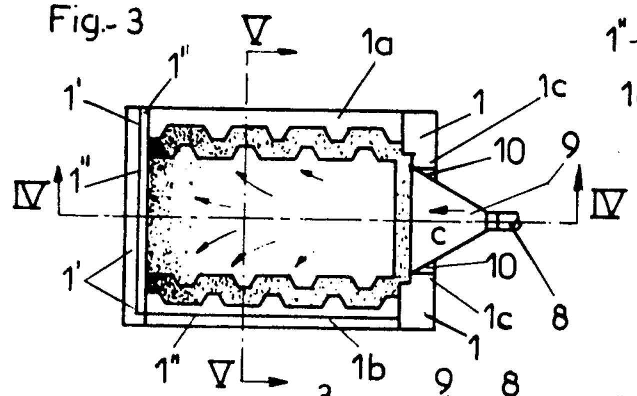
Fig.- 6
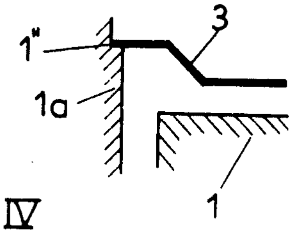
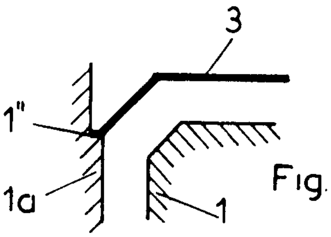
Fig.- 7
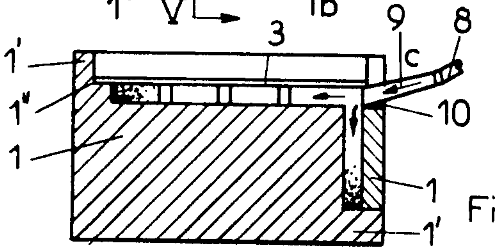
Fig.- 4
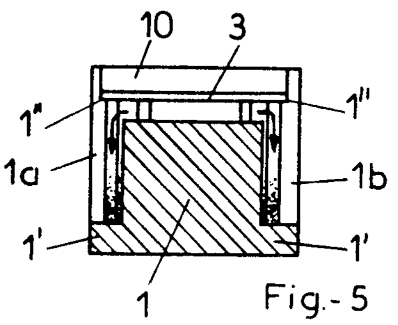
Fig.- 5
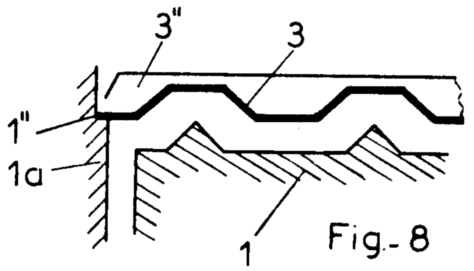
Fig.- 8

METHOD AND APPARATUS FOR FILLING MOLDS

This is a continuation, of application Ser. No. 337,217, filed Mar. 1, 1973 which is a division of application Ser. No. 78,959, filed Oct. 7, 1970, which in turn is a continuation of application Ser. No. 655,024 filed July 21, 1967.

BACKGROUND OF THE INVENTION

1. Field of the Invention

The present invention relates to a method and apparatus for filling molds and especially molds of an intricate shape with nonflowing molding materials, particularly comminuted organic fibrous materials which are mixed with suitable binders, for example, heat-setting synthetic resins.

2. Description of the Prior Art

Prior to this invention, molds of this type have usually been filled by hand. This had, however, the disadvantage that even the operation of filling molds of a relatively simple shape required a considerable length of time and that it was practically impossible to distribute the molding mixture in the mold so as to have the desired uniform density at all points.

Mechanical filling devices for such molds have also been developed wherein the molding material after passing through an arrangement of rotating spiked rollers is filled at a steady rate through a funnel into the mold. By making these spiked rollers of a suitable design and dimensions, by providing them in a suitable arrangement and driving them at a suitable speed, it is possible to treat the molding material to a certain extent in accordance with its different layer thicknesses so as to attain a substantially homogeneous molded body. Although this method may be satisfactory for properly filling molds of a simple shape, it does not produce any satisfactory results if the molds are of an intricate shape, since it may often occur that the molding mixture will not pass with the required uniform density into more remote and difficultly accessible parts of such a mold. Furthermore, the mechanical effort of carrying out this method and the expense for the necessary apparatus, as well as the amount of space such apparatus requires, are very considerable.

Attempts have also been made to attain a uniform filling of the mold by vibration, shaking or jarring. These methods and especially that of vibrating the mold are, however, applicable only to lighter molds and hardly, if at all, to large and heavy molds. Furthermore, especially when applying the vibration method, vibration nodes will occur which cause the molding material to settle into certain shapes. Shaking and vibrating a mold also result in a separating effect whereby the coarser and finer particles become more or less separated from each other or are sorted according to their degree of fineness. The material will then either be distributed in accordance with the shapes caused by the vibration nodes or the coarse particles will be brought up to the upper surface of the mold. Particularly the last-mentioned effect is, however, very undesirable if the molded bodies should have the smoothest possible outer surface, for example, for being provided with a decorative coating.

SUMMARY OF THE INVENTION

It is an object of the present invention to provide a method and an apparatus for distributing a nonflowing molding mixture consisting of comminuted fibrous materials and a suitable heatsetting binder as uniformly and quickly as possible in a mold, and especially in a mold of an intricate shape. For attaining this object, the invention provides that the nonflowing molding material is blown from a suitable point into the mold in such a manner that the material will be progressibely deposited within the area to be filled and at first at the remotest or most difficultly accessible parts of the mold from which it will then be progressively added to all other points so as to accumulate gradually in the direction toward the point where it is blown into the mold until the entire mold chamber is filled with the molding mixture.

The features and advantages of the present invention will become more clearly apparent from the following detailed description thereof which is to be read with reference to the accompanying drawings.

BRIEF DESCRIPTION OF THE DRAWINGS

FIG. 1 shows a purely diagrammatic illustration of an apparatus for carrying out the method according to the invention;

FIG. 2 shows a top view of the blast nozzle as employed in the apparatus according to FIG. 1;

FIG. 3 shows a top view of a mold which is connected to an apparatus according to FIG. 1;

FIG. 4 shows a vertical longitudinal section which is taken along the line IV—IV of FIG. 3;

FIG. 5 shows a vertical cross section which is taken along the line V—V of FIG. 3; while FIGS. 6 to 8 show parts of cover plates of different shapes.

DESCRIPTION OF THE PREFERRED EMBODIMENTS

In the drawings, FIG. 1 shows very diagrammatically an apparatus for carrying out the inventive method. For producing a three-dimensional molded object, a female mold 1 is provided. Laterally acting plungers 1*a*, 1*b*, 1*c*, which are movable in a horizontal direction, are moved outwardly so that the entire mold cavity which is to be filled between the core part of the mold and the lateral plungers 1*a*, 1*b*, 1*c*, is empty. The male mold 2 acting from above is moved upwardly for such a distance that the female mold 1 is easily accessible from above. This mold is then covered by a screen or an orifice plate 3. This screen or orifice plate 3 is spaced from the core part of the mold at such a distance that between this screen or orifice plate 3 and the upper surface of the core part the distance will be produced which corresponds to the required layer thickness of the molding mixture which is to be applied above the upper surface of the core part. Of course, this distance may be made adjustable in accordance with the particular results to be attained.

The molding material consisting of a mixture of comminuted organic fibers and a binder is located in the upper chamber 4 of a supply bin which is separated from its lower chamber 4' by a gate 5 in the nature of a bucket wheel. This gate which may be turned constantly or intermittently either by hand or mechanically at a variable speed, for example, in the direction as shown by the arrow *a*, is adapted to convey the molding material at the required speed and in the desired amount to the lower chamber 4'.

By means of the blower 6, air of a certain pressure is blown through the channel 7 in the direction of the arrow *b* into the lower chamber 4' of the storage bin and is then conducted in the direction of the arrow *c* through a flexible channel 8 to the nozzle 9 which may be inserted into a suitable aperture 10 in the wall of the female mold 1.

The bucket-wheel gate 5 prevents the air which flows under pressure into the lower chamber 4' from escaping upwardly into the storage bin 4, and by its rotation it conveys the molding mixture into the lower chamber 4'. The air current which enters the lower chamber 4' through the channel 7 and then flows through the channel 8 in the direction of the arrow *c* conveys the molding mixture which has been passed into this chamber by the rotary gate 5 through the nozzle 9 to the inside of mold 1 where due to the velocity of the air current this mixture is at first conveyed to and deposited in the most remote parts of the mold chamber, while the air escapes through the screen or orifice plate 3 to the outside. The particles of the molding material which are injected by the air current are then deposited progressively from the most remote places of the mold chamber upon the particles which are already deposited so that the material gradually accumulates in the direction toward the blast aperture 10 until the mold is completely filled.

In this manner it is possible to fill even a mold of the most intricate shape absolutely uniformly, that is, at a uniform density of the molding material and without leaving any unfilled spaces. After the female mold has thus been completely filled, the blast nozzle 9 is removed and the inlet opening 10 is closed in any suitable manner and the screen or orifice plate 3 is lifted off the female mold and the male mold 2 is moved into the latter from above. The molding operation may be carried out in the conventional manner and it is then possible either to produce a premolded blank by cold molding or a finished article by simultaneous heating.

In order to fill the mold properly up to the mouth of the nozzle 9 or up to the inlet opening 10, an aperture may be provided in the wall of the nozzle which may be closed by a hinged flap 9', as shown in FIG. 2. Underneath this flap 9', the aperture is covered by a relatively fine-meshed wire screen which prevents the molding material from escaping. Thus, the molding material may be filled uniformly into the mold up to the nozzle opening since the increasing pressure of the air will open the flap 9' so that the air can escape as soon as the mold itself is completely filled and the air can no longer pass through the mold and out through the openings in the screen or the orifice plate 3.

FIGS. 3, 4, and 5 illustrate the filling operation of a mold of a more intricate shape. FIG. 3 shows a top view of the female mold when the covering screen or orifice plate 3 is removed for clarity and at a time shortly after the filling operation has been started. FIG. 4 shows a vertical section of the same mold which is taken along the line IV—IV of FIG. 3, while FIG. 5 shows a vertical section of the same mold which is taken along the line V—V of FIG. 3.

The mold as illustrated in FIGS. 3 to 5 serves for producing a molded article which consists of a flat upper wall, a flat end wall extending at a right angle thereto, and two opposite side walls with rib-shaped corrugations. The side of the article opposite to the end wall as well as the lower side remain open. The molding material which has already been deposited in the mold is indicated by dots. The density at which these dots are spaced from each other is not intended to indicate the density of the deposited material but merely the thickness of the particular layer of the material as seen in the direction in which it is deposited.

The solid part of the female mold 1 consists of a core which is connected above and at the sides to the surfaces 1' which limit the edges of the open sides of the body to be formed and also serve as guides for the different movable plungers 1*a*, 1*b*, and 1*c* and the male mold 2 coming from above. The blast nozzle 9 is inserted into the aperture 10 in plunger 1*c* which after the nozzle 9 is removed is filled out for the molding operation by a suitable closure member.

For filling the mold, the air current which takes the molding material along in the direction of the arrow *c* is blown under a suitable pressure or a suitable velocity into the mold and carries the particles of the material to the remotest corners of the mold where because of the sudden change in cirection of the air current these particles are deposited by the centrifugal force and then progressively accumulate toward the nozzle 9 and thereby build up the material to form a cohesive uniform filling. After the particles are deposited, the air escapes through the screen or orifice plate 3. The air currents are indicated in the drawings by small arrows. These drawings also indicate how the molding material is built up at the same time from the bottom and the rear of the mold until the latter is filled completely.

Of course, the particular mold as herein described is only to be regarded as an example. The method according to the invention may be applied in connection with any other mold which may be either of a still more intricate shape or of a very simple shape.

Instead of placing the screen or orifice plate upon the mold 1, as illustrated in FIG. 1, for example, by means of a frame 3' in which the screen or orifice plate is adjustably mounted so as to project below the lower edge of the frame and to the inside of the mold, it is also possible to design the mold itself in such a manner that the screen or orifice plate rests on a shoulder 1" which is provided on the different parts of the mold itself. The aperture 10 for the nozzle 9 may be made of any shape are provided in any position in accordance with the particular requirements of the mold which is to be filled. Thus, for example, it does not have to be provided on a lateral edge of the mold as illustrated but it may also be located within one of the limiting surfaces, for example, the upper limiting surface substantially at the center thereof. The angle at which the molding material is blown into the mold or at which the nozzle is inserted into the mold may also be varied in accordance with the particular prevailing conditions, especially if the inlet opening or the nozzle is located at a lateral edge of the mold. If the nozzle is inserted at the center of one of the lateral surfaces or of the upper or even the lower surface, its axis should preferably extend at a right angle to this surface.

In the particular embodiment as illustrated it is assumed that the nozzle which increases in width toward its outlet opening has a flat shape so that the edges of the outlet opening form approximately an oblong rectangle. Of course, the nozzle may also be made of any other suitable shape so that the edges of the outlet opening form, for example, an elongated oval or a circle.

When employing an orifice plate in place of a screen, the advantage is attained that the apertures through which the air passes may have a larger diameter than in a screen so that the danger that these apertures may be clogged is considerably reduced. Furthermore, the arrangement, the diameter and the spaces between the apertures may be adapted to the particular conditions of the mold, for example, in such a manner that by a suitable distribution of the apertures at such points where sharp corners are to be provided in the mold, a turbulence of the air current will be avoided which carries the molding material to be deposited. The ratio between the apertures and the solid parts between them may therefore be made unequal at different points. If desired, it is also possible when using such an orifice plate to control the filling operation by covering some of the apertures.

Of course, the screen or the orifice plate, the distance of which from the inner limiting surface of the mold may, as already stated, be adjustable in accordance with the desired thickness of the molded layer, may also be inserted not from above but from one of the sides in place of a fully withdrawn plunger. The screen or orifice plate may also have a profiled shape if, for example, the respective outer surface of the molded body should have a certain profile. Examples of such a screen or orifice plate 3 are illustrated in FIGS. 6 to 8. In FIG. 8, the orifice plate is reinforced by a reinforcing rib 3" which extends transverse to the longitudinal direction of the profiles.

By varying the air pressure which is produced by the blower and thus the velocity of the air current, it is possible to vary and control the density of the filling of the mold.

The air which emerges through the apretures in the screen or orifice plate, and which, of course, takes along a certain amount of fine particles, may preferably be sucked off by means of a suction device, not shown, and be returned into the storage bin 4. In this manner it is possible to reduce the degree of contamination of the surrounding atmosphere and to recover the fine particles which are taken along by the discharged air.

In place of the embodiment of the invention as illustrated in FIG. 1, in which the molding material is fed to the air current after the latter already passes under pressure and at a certain velocity from the blower into the lower part of the storage bin, it is possible to provide the blower between the storage bin and the mold. In this case, the molding material will first be sucked up by the blower, be conducted together with the air current through the blower, be accelerated, and then be blown under pressure and at the required velocity into the mold.

When carrying out the method in actual practice it may in some cases be advisable to make the required filling device of a movable construction so as to permit it to be employed alternately for filling different molds. For this purpose, it may, for example, be mounted in a fixed position and be pivotable or adjustable in association with several fixed molds for filling them one after the other, or it may be mounted on a carriage for being moved entirely to different molds. In other cases it may be necessary to associate the filling device in a fixed position with a single mold, for example, when by means of this filling method the entire filling and molding operation including the removal of the finished article from the mold is to be carried out automatically. As soon as the filling operation has been completed, which may be checked, for example, by opening the mentioned flap 9', the part of the filling device which is directly connected to the mold, as well as the screen or orifice plate and the suction device should then be lifted off or pivoted away from the mold for the following molding operation in order to permit the particular male mold or plunger which for the filling operation was moved away then to be inserted into the mold. After the molding operation and after the finished molded article has been removed from the mold, the movable parts of the filling device, for example, a part of the supply channel, the nozzle, and the screen or orifice plate including the suction device, are again pivoted toward the mold and inserted therein, whereupon a new filling operation may be carried out.

The method according to the invention insures that even molds of an intricate shape will be filled and packed at all points uniformly and homogeneously with the molding material. The new method has the further advantage over the conventional manual filling method that it will be carried out within a much shorter length of time. Over the known filling methods by mechanical means such as spiked rollers or the like the apparatus for carrying out the inventive method has the advantage of requiring considerably less space and of being less expensive. Furthermore, the method according to the invention also has the advantage over the known methods that especially the fine material is conveyed to the points adjacent to the apertures, i.e., to the outer surface which defines the molded object. This means that the outer fine material results in a less porous and very smooth and fine outer surface of the finished article which is especially of importance if this surface is to be coated with a decorative layer.

A still further very important advantage of the method according to the invention is the fact that it may be employed for carrying out the successive steps of the production of molded parts even of a very intricate shape fully automatically, that is, from the time of filling the molding material into the mold up to the ejection of the finished molded article. As a matter of fact, such a fully automatic operation cannot be carried out, except by employing the filling operation according to the invention.

Of course, the different possibilities of arranging the necessary appliances for carrying out the method according to the invention are only given by way of example and do not exclude the application of other suitable means for accomplishing the same purposes.

We claim:

1. A method of filling a mold with fibrous material and pressure molding the material in the mold, said method comprising the steps of providing a female mold having a cavity having an open end and an inlet port extending transverse to said open end and communicating with the cavity adjacent said open end; placing across said open end a screening device having an inner surface facing the interior of said cavity and having a predetermined configuration; feeding into a stationary chamber spaced from said mold a stream of the fibrous material in a first direction while passing a stream of gas in a second direction transverse to said first direction through the stream of fibrous material so that the fibrous material is entrained by said gas stream; blowing said stream of gas with said fibrous material entrained therein through said inlet port into the cavity of said mold substantially parallel to and adjacent the screening device while venting the gas through said screening device thus retaining the fibrous material in said cavity for uniformly charging the same; terminating admission of the stream of gas with the fibrous material entrained therein when the cavity is fully charged; closing said port; removing said screening device; and applying a male plunger of a configuration corresponding to said predetermined configuration through said open end of said cavity to thereby pressure mold the fibrous material in said mold.

2. A method as defined in claim 1, wherein said gas is vented to a different degree in different areas of the screening device by providing in the latter apertures of different cross-sections.

3. A method as defined in claim 1, wherein the step of feeding a stream of fibrous material into said chamber comprises the step of mechanically feeding material from another chamber located adjacent said one chamber.

4. A method as defined in claim 1, wherein said step of providing a female mold comprises positioning a core element in requisite stationary position in said cavity and positioning a plurality of cavity defining plunger elements about said core element so that they define with the latter a mold cavity, and wherein the step of pressure molding the material in the mold cavity comprises the step of moving said male plunger in a first direction towards said stationary core element and moving the plunger element in a direction transverse to said first direction towards said core element.

5. A method as defined in claim 1, wherein said inner surface of said screening device is configurated in accordance with the corresponding surface of the article to be pressure molded in said mold.

* * * * *